United States Patent

[11] 3,596,160

| [72] | Inventor | Rodney G. Rakes |
| | | Charlottesville, Va. |
| [21] | Appl. No. | 862,736 |
| [22] | Filed | Oct. 1, 1969 |
| [45] | Patented | July 27, 1971 |
| [73] | Assignee | Sperry Rand Coporation |

[54] INTERLOCKING DIRECTIONAL CONTROL AND BRAKING CIRCUIT FOR BRUSHLESS DC MOTOR
8 Claims, 1 Drawing Fig.

[52] U.S. Cl. ................................................ 318/258, 318/203 R, 318/261
[51] Int. Cl. ........................................................ H02p 1/22
[50] Field of Search .......................................... 318/138, 168, 203, 257, 258, 379, 380, 261

[56] References Cited
UNITED STATES PATENTS
| 3,435,314 | 3/1969 | Bradley et al. ................ | 318/138 |
| 3,457,485 | 7/1969 | Leonard ........................... | 318/257 |
| 3,466,520 | 9/1969 | Aylikci et al. ................... | 318/138 |
| 3,504,258 | 3/1970 | Stern et al. ...................... | 318/257 |

Primary Examiner—Gene Z. Rubinson
Attorney—S. C. Yeaton

ABSTRACT: A control circuit for a reversible brushless DC motor (BDCM) includes first and second channels to supply clockwise and counterclockwise command signals to the motor in response to corresponding directional input signals. The two channels are interlocked so that a command signal in one channel disables the other channel. Each channel also includes means to delay the formation of a command signal for a predetermined time and a braking circuit coupled to each channel for providing a braking signal in the absence of a command signal.

PATENTED JUL 27 1971
3,596,160
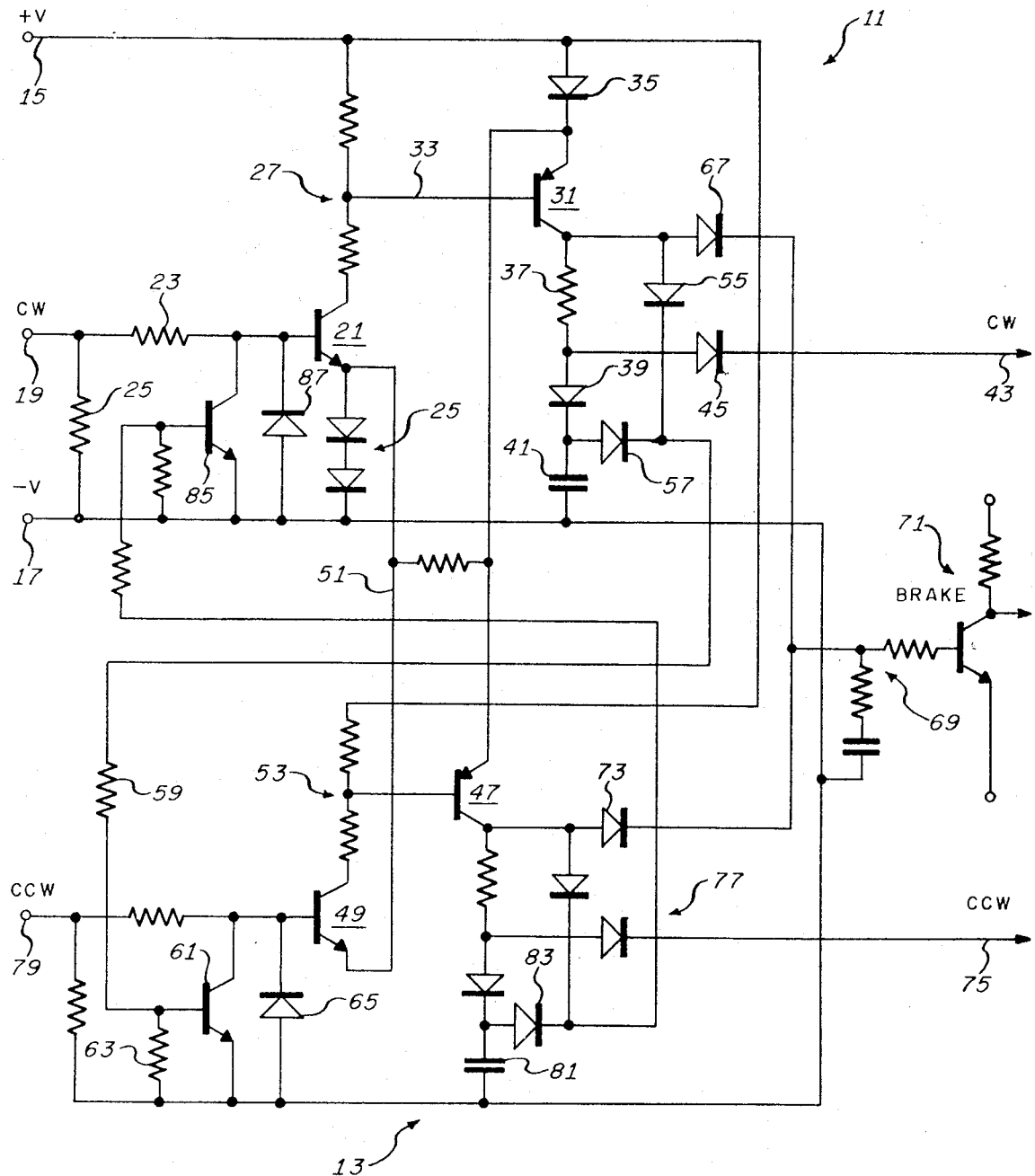
INVENTOR
RODNEY G. RAKES
BY
Joseph M. Roehl
ATTORNEY

INTERLOCKING DIRECTIONAL CONTROL AND BRAKING CIRCUIT FOR BRUSHLESS DC MOTOR

BACKGROUND OF THE INVENTION

1. Field of the Invention

This invention relates to a motor control circuit and more specifically to a directional control circuit for a BDCM.

2. Description of the Prior Art

BDCM's are well known in the art. In general, these devices employ a stator winding comprised of a plurality of spatially distributed coils and a permanent magnet rotor. Electronic rather than mechanical commutating means, are employed for sequentially energizing the stator coils so as to establish a rotating flux field for actuating the rotor.

The electronic commutating means operates by sensing the instantaneous rotor position and then directing current from a DC supply to appropriate stator coils for maintaining the desired rotation.

A motor of this type, for instance, is described in U.S. Pat. No. 3,377,534 entitled "Brushless DC Motor," issued to Roy K. Hill and assigned to the present assignee.

In this motor, a light beam is caused to rotate in synchronism with the rotor. The beam scans an array of photocells mounted annularly around the rotor. These photocells in turn, actuate circuits that energize the stator windings sequentially so as to maintain the desired rotation. The aforementioned patent also describes a motor in which either direction of rotation may be realized by utilizing a second array of photocells. The electrical connections for this second array of photocells duplicate those of the first array but are physically located 180° from the first array. A command signal may then be used to render one or the other of these arrays active so as to obtain rotation in either direction.

In its simplest form, a rotational control circuit for such a motor would merely consist of a reversing switch for applying an actuating voltage to one or the other of the arrays of photocells.

In practical applications, more elaborate switching means are necessary. Logic circuits may be employed, for instance, which react to incoming data so as to set the reversing switch. In the past, such systems have some times resulted in faulty operation in that signals commanding rotation in both directions might be received simultaneously. In other instances, two signals may be received in such rapid succession that the motor cannot respond properly. Similarly, situations may arise where an attempt is made to reverse the motor while the rotor is still rotating. This condition is known as "-plugging." Such a phenomenon allows excess currents and voltages to occur in electronic commutation circuits which can cause the motor to malfunction and may actually damage these components.

Conventional dynamic braking systems have been devised for BDCM's. These systems quickly stop the motor when the power is removed. Briefly, these systems require only that circuits be provided for shorting out sections of the stator winding so as to force the motor to act as a generator and thus absorb the rotational energy in the shorting circuit.

The addition of such braking circuits to conventional BDCM's has resulted in further complications in that a brake signal may be inadvertently applied during the occurrence of a direction command signal. This condition can again result in a short circuit that would damage the electronic components in the commutating circuits.

SUMMARY OF THE INVENTION

The circuit of the present invention supplies reliable command and braking signals to a reversible BDCM by preventing the formation of a command signal until a predetermined time interval has elapsed after the termination of a preexisting command signal and by providing a braking signal that commences at the termination of the preexisting command signal but has a duration less than the predetermined time interval.

BRIEF DESCRIPTION OF THE DRAWING

The single FIGURE is a circuit diagram illustrating the presently preferred form of the invention.

DESCRIPTION OF THE PREFERRED EMBODIMENT

Referring now to the FIGURE, the presently preferred circuit includes a first channel 11 and a second channel 13. The two channels are essentially identical. A supply voltage is applied between the +V terminal 15 and the −V terminal 17. The channel 11 processes clockwise signals whereas the channel 13 processes counterclockwise signals. Clockwise input signals in the form of DC voltages, are applied to the clockwise terminal 19. These signals are applied to an input transistor 21 through a series resistor 23 and across a shunt resistor 25. The transistor 21 has its emitter connected to the negative source of voltage through a pair of diodes 25 and its collector coupled to the positive source of voltage through a pair of resistors 27. The diodes 25 cooperate to provide a bias for the transistor 21 that serves to overcome the effects of noise in the circuit. Thus, a signal applied to the terminal 19 must exceed a nominal value of approximately 1.7 volts to overcome the bias on the transistor 21 and drive it into the conducting state. When transistor 21 is driven into this conducting state, a signal is applied to the output transistor 31 through the line 33. The transistor 31 has its emitter connected to the positive supply voltage through a diode 35 and its collector connected to the negative supply through a collector resistor 37, a diode 39 and a capacitor 41. The resistor 37, the diode 39 and the capacitor 41 form a command signal delay circuit.

The junction between the resistor 37 and diode 39 is connected to an output terminal 43 through a diode 45.

The junction between the transistor 31 and the diode 35 is connected to the corresponding output transistor 47 in the counterclockwise channel 13. Similarly, the input transistor 21 in the channel 11 has its emitter connected to the emitter of the corresponding input transistor 49 in the channel 13 through a line 51.

The collector of the input transistor 49 is connected to the positive voltage source through a pair of resistors 53.

The collector circuit of the output transistor 31 in the channel 11 is coupled through a diode 55, a diode 57 and a resistor 59 to the base of a shorting transistor 61 in the channel 13. The base of the transistor 61 is also connected to the negative voltage supply through a resistor 63. A protective diode 65 is reverse-biased across the shorting transistor 61.

It will be noticed that the shorting transistor 61 is driven directly from the collector of the output transistor 31. Thus, the switching circuit in the channel 13 is disabled as soon as the transistor 31 is turned on and before the command signal is formed at the clockwise terminal 43.

When the transistor 31 is subsequently turned off, howev:r, the charge on the capacitor 41 will leak off through the diode 57, the resistor 59, and the transistor 61. This prevents "-plugging" by maintaining the transistor 61 in a conducting state for an additional brief period so as to prevent a counterclockwise signal from actuating the counterclockwise switching circuit in the channel 13 until the motor has had time to come to a stop.

The output of the transistor 31 in the channel 11 is connected through a diode 67 to an R-C braking circuit 69. The braking circuit is also connected to the output transistor 47 in the channel 13 through a diode 73.

Thus, a voltage is applied to the braking circuit 69 when either transistor 31 or 47 is turned on. If the particular motor to be driven requires the application of a voltage to release the brake, a voltage from the circuit 69 may be used directly. If the motor requires the application of a voltage to apply the brake, an inversion circuit indicated functionally at 71 may be employed.

Since the braking circuit is coupled directly to the collectors of the transistors 31 and 47, a voltage will be applied to the braking circuit as soon as one of these transistors is turned on, whereas a command signal will be formed only after the charge on capacitor 41 or 81 reaches a predetermined level. This assures that the brake will be released before a command signal is applied to the motor.

The output transistor 47 in the channel 13 is connected to a counterclockwise output terminal 75 through a circuit 77 identical to the collector circuit in the output of the corresponding transistor 31 in the channel 11.

Counterclockwise input signals are applied to the channel 13 through the terminal 79.

The signal across the capacitor 81 in the collector circuit of the transistor 47 is applied through a diode 83 to a shorting transistor 85 in the channel 11. The transistor 85 is further shunted by a back-biased diode 87. The shorting transistor 85 functions in the same manner as the corresponding transistor 61 in the channel 13.

In operation, an input signal applied to the terminal 19 will drive the transistor 21 into conduction. This will cause the output transistor 31 to turn on so that capacitor 41 will charge through diode 39, resistor 37, transistor 31 and diode 35. The anodes of diodes 39 and 45 will then be initially clamped to the value of the diode 39 voltage drop, but will rise exponentially to a voltage determined by the steady state voltage at the junction of the resistor 37 and the diode 39. This voltage is applied to the clockwise output terminal 43 through the diode 45. Since a command signal, to be effective, must necessarily have a magnitude sufficient to actuate the sensors in the motor to be controlled, the exponential rise in voltage serves as a convenient method to delay the application of an effective command signal to the motor until the output of the brake is removed. The delay in the command signal can be adjusted by proportioning the various components so that the output voltage will exceed the necessary threshold value only after a predetermined time interval.

When the transistor 31 is turned on by the application of an input voltage to the terminal 19, a current path is also established through the diode 35, the transistor 31, the diode 55, the resistor 59 and the emitter-base junction of the shorting transistor 61 in the channel 13. While the transistor 61 is conducting, any signal applied to the counterclockwise input terminal 79 is prevented from actuating the transistor 49.

When transistor 31 is turned on, a voltage is also applied to the braking circuit 69. If the particular motor to be driven employs a braking means in which the brake is applied when the braking voltage is off, the braking signal may be taken directly from the circuit 69, otherwise the braking signal may be taken from a circuit 71.

When the signal is removed from the input terminal 19, the transistors 21 and 31 are turned off, the shorting transistor 61 is turned off after a brief delay, and the output to the brake circuit is removed. The time constant of the braking circuit 69 is adjusted to be long enough to insure that the voltage has been removed from the command output terminals before braking is applied, yet short enough to insure that braking is terminated before an effective command signal can be formed in response to the application of a directional input signal.

Thus, in a typical situation, when the motor is to be started, the first signal applied to either of the directional control input terminals 19 or 79 will first disable the opposite channel and provide a voltage across the braking circuit 69 that serves to release the brake on the motor to be controlled. For example, if a clockwise signal is first received, a signal will disable the counterclockwise switching circuit and another signal will be applied to the braking circuit sufficient to remove the brake. Some time thereafter, the common signal at the terminal 43 will reach a sufficient magnitude to initiate rotation in the motor.

Assume now that the first-applied clockwise signal is terminated and a counterclockwise signal is applied an appreciable time thereafter in order to reverse the rotation of the motor. Under these conditions, when the clockwise signal is terminated, the braking circuit 69 is discharged so as to brake the motor and then the counterclockwise switching circuit is enabled. At the same time, the clockwise command signal at the terminal 43 is reduced as the charge on the capacitor 41 decays. When the counterclockwise signal is applied to the terminal 79, the switching circuit in the clockwise channel 11 is disabled and the braking circuit is energized so as to release the brake on the motor as the capacitor in the braking circuit becomes charged. The voltage at the counterclockwise output terminal 75 gradually builds up to the threshold level necessary to actuate sensors in the motor so as to permit counterclockwise rotation thereof. If, however, a counterclockwise signal is applied to the terminal 79 while the clockwise signal is still being applied, the later-applied counterclockwise signal will be shunted through the shorting transistor 61 in the channel 13 so as to have no effect on the associated switching circuit or on the motor.

If the counterclockwise signal is applied too soon after the termination of the clockwise signal, the counterclockwise switching circuit will not be enabled until after the motor has had a chance to come to a stop.

Although the operation has been described with reference to signals originally applied to the clockwise input terminal, it will be appreciated that because of the symmetry of channels 11 and 13, correlative effects will occur when a signal is originally applied to the counterclockwise input terminal.

Thus, the circuit of the present invention provides an operating sequence that prevents malfunction and consequent damage due to improperly applied input signals.

I claim:

1. A control circuit for a reversible BDCM comprising individual channels for supplying clockwise and counterclockwise command signals to an external BDCM in response to clockwise and counterclockwise input signals respectively, delay means in each channel for delaying the formation of a command signal for a specific time after the reception of a corresponding input signal, switching means in each channel, said delay means including a resistor and a capacitor connected in series with the switching means in the same channel, said delay means being constructed so that the magnitude of the command signal is a function of the charge on said capacitor, said switching means being constructed and arranged to turn on in response to an input signal received by the channel, said delay means being actuated when the switching means in the same channel is turned on, means to disable the switching means in one channel while the switching means in the opposite channel is turned on, said disabling means further including means to maintain the switching means in said one channel in a disabled condition for a specified time after the switching means in the opposite channel is turned off, and braking means for supplying a braking signal to said BDCM in the absence of a command signal.

2. The apparatus of claim 1 wherein said resistor and capacitor are proportioned to provide a capacitor charging rate such that the command signal reaches a specific level only after the expiration of a predetermined capacitor charging time.

3. The apparatus of claim 2 wherein each switching means includes an output transistor having a pair of output terminals and wherein the corresponding delay means, braking means, and disabling means are all actuated from the same one of said pair of transistor output terminals.

4. The apparatus of claim 3 wherein each disabling means includes a shorting transistor connected across the input to the switching means in the same channel, said shorting transistor being further connected to respond to the switching circuit in the opposite channel.

5. The apparatus of claim 4 further including first and second power busses for connecting said control circuit to a source of power, said apparatus also including first rectifying means for coupling the other of said pair of transistor output terminals directly to one of said power busses.

6. The apparatus of claim 5 wherein the resistor in each of said delay means is connected directly to the transistor output terminal and the capacitor in the same delay means is connected directly to the other of said power busses, each of said delay means further including a first diode connected serially between said resistor and said capacitor, said apparatus further characterized in that command signals are taken from the junction of said resistor and said diode.

7. The apparatus of claim 6 wherein said disabling means is further coupled to said capacitor through a second diode, said second diode being oriented to pass current from said capacitor to said disabling means.

8. The apparatus of claim 7 wherein said braking means includes a braking resistance-capacitance network coupled between the other of said power busses and the output terminal on both of said output transistors, said braking network having a time constant that is short with respect to that of said command signal delay means.